United States Patent [19]

Lemelson

[11] 4,288,398

[45] Sep. 8, 1981

[54] APPARATUS AND METHOD FOR CONTROLLING THE INTERNAL STRUCTURE OF MATTER

[76] Inventor: Jerome H. Lemelson, 85 Rector St., Metuchen, N.J. 08840

[21] Appl. No.: 663,243

[22] Filed: Mar. 3, 1976

Related U.S. Application Data

[63] Continuation-in-part of Ser. No. 372,838, Jun. 22, 1973, abandoned, and a continuation-in-part of Ser. No. 53,834, Jul. 10, 1970, abandoned, and a continuation of Ser. No. 516,280, Dec. 27, 1965, abandoned, which is a continuation-in-part of Ser. No. 142,405, Oct. 2, 1961, Pat. No. 3,422,648, and Ser. No. 142,333, Oct. 2, 1961, abandoned.

[51] Int. Cl.³ .............................................. B29F 3/00
[52] U.S. Cl. ...................................... 264/23; 264/70; 425/174.2
[58] Field of Search ................ 264/23, 176 R, 70; 164/49; 425/174.2

[56] References Cited

U.S. PATENT DOCUMENTS

| | | | |
|---|---|---|---|
| 1,318,740 | 10/1919 | Fessenden | 164/49 |
| 2,408,627 | 10/1946 | Green | 264/70 X |
| 2,615,271 | 10/1952 | Ulmer | 264/70 X |
| 2,763,040 | 9/1956 | Korb | 164/49 |
| 2,897,557 | 8/1959 | Ornitz | 164/49 |
| 2,973,564 | 3/1961 | Dixon | 164/49 |
| 3,045,302 | 7/1962 | Patton | 164/49 X |

*Primary Examiner*—Thomas P. Pavelko

[57] ABSTRACT

An apparatus and method are provided for controlling the internal structure of articles of manufacture which are formed by solidifying a plastic or metal in a mold or extrusion die simultaneously as ultrasonic energy is applied to the solidifying material to effect beneficial control of the crystalline structure formed thereof upon solidification. Ultrasonic energy may be transmitted to the solidifying material through either the wall of the die or mold, a mandrel portion of a die or a portion of a mold which defines a cavity formation in the molded article. Ultrasonic vibrations may be utilized per se or in combination with other forms of energy applied to the solidifying material so as to orient or otherwise control the grain or crystalline structure thereof for improving the strength and other physical characteristics of the solidified article.

5 Claims, 8 Drawing Figures

APPARATUS AND METHOD FOR CONTROLLING THE INTERNAL STRUCTURE OF MATTER

RELATED APPLICATIONS

This is a continuation-in-part of application Ser. No. 372,838 filed June 22, 1973, now abandoned, and a continuation-in-part of Ser. No. 53,834 filed July 10, 1970, abandoned, and a continuation of Ser. No. 516,280 filed Dec. 27, 1965, abandoned, which was a continuation-in-part of both Ser. No. 142,405 filed Oct. 2, 1961, now U.S. Pat. No. 3,422,648, and Ser. No. 142,333 filed Oct. 2, 1961, abandoned.

This invention relates to an apparatus and method for forming moldable materials including such materials as thermoplastic and thermosetting polymers, metals, certain ceramic materials and composite materials which may be formed to shape in a mold or die such as an injection mold, die casting mold, continuous casting mold or extrusion die wherein the material is introduced therein or processed to shape in a molten or flowable condition such that it may be caused to crystalize or otherwise form a defined internal structure as, or shortly after, it attains its molded shape.

During the formation of many materials such as metals or polymers from a molten or plastic condition, imperfections frequently form in the material such as surface irregularities, cracks, internal occlusions or flaws, porosity due to the formation of gas pockets, etc. The strength of materials formed by conventional techniques is often substantially less than that which may be obtained due not only to the formation of surface and internal flaws but also to the fact that the internal structure of the material, such as its crystalline structure, is frequently imperfect. Such imperfections may result from the lack of control of the growth and formation of crystals, such as metal crystals, due to disorientation thereof or the size and arrangement of spherulites common in many polymers.

Accordingly, it is a primary object of this invention to provide an apparatus and method for improving the structures of various articles of manufacture formed from a molten or plastic state by predeterminately controlling the formation of such articles including their internal characteristics, such as crystal growth and orientation, spherulite formation and the like by the application of controlled wave energy to the solidifying or forming material, such as ultrasonic energy, induction energy, shockwaves and magnetic fields applied per se or in combination with one of the other forms of such energy to the solidifying material.

Another object is to provide an improved apparatus and method for controlling the solidification of a material in a mold by applying sharp, intermittent forces to the material as it solidifies.

Another object is to provide an apparatus and method for controlling the internal structure of an article by means of an intense magnetic force applied to the article solidification.

Another object is to provide an improved method of enhancing the strength of metals by use of an intense magnetic field to control crystal growth.

Another object is to provide a method of improving and enhancing the strength of a material such as a polymer by the application of one or more of the forces of magnetism, sound such as ultrasonic energy and intense vibrations applied directly to the material as it solidifies.

Another object is to provide a method for improving the internal structure of molded plastic or metal articles by the combined forces of magnetism and ultrasonics applied thereto in a predetermined manner as the material solidifies.

Another object is to provide an improved method for controlling the internal structure and crystal growth within the continuously shaped article such as an extrusion or continuous casting formed from a molten or semi-molten metal such as a melt or supply of powdered metal rendered molten or semi-molten.

Another object is to provide an apparatus and method for controlling the shape and internal structure of an article as it is molded by applying a shockwave or plurality of shockwaves to the material during one or more predetermined times in the molding cycle.

With the above and such other objects in view as may hereafter more fully appear, the invention consists of the novel constructions, combinations and arrangements or parts as will be more fully described and illustrated in the accompanying drawings, but it is to be understood that changes, variations and modifications may be resorted to which fall within the scope of the invention as claimed.

Figure 1:
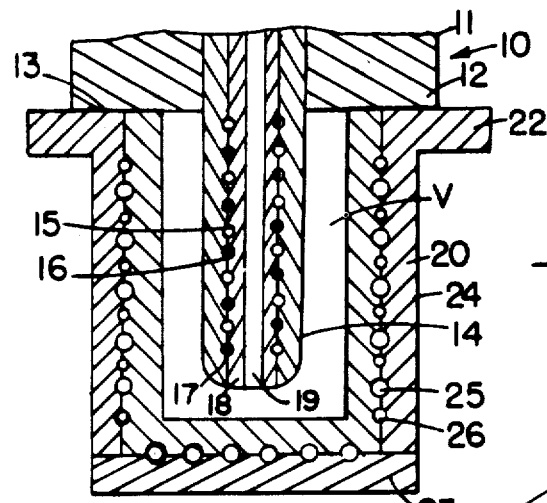
FIG. 1 is a cross-sectional view of male and female components of a mold and illustrating transducing means associated with the walls of the mold components.

In FIG. 1 is shown part of a molding apparatus 10 including a first mold member 11 operative to close with a second mold member 20 to define a volume V therewith in which volume molding material may be formed to shape from a molten or flowable condition. The mold member 11 has a base portion 12 with a surface 13 for engaging a rim or flange portion 22 of the second mold member 20 when either or both said members are urged together for sealing the volume V upon closure of the mold. Mold member 12 is shown having a nose portion 14 projecting into volume V for defining, for example, the interior surface of a molding, forging or extrusion formed in the mold. A number of separate components are utilized in the assembly of mold member 12 to define a plurality of passageways in the nose portion 14 and/or the base portion 12 thereof. A first passageway 15 is shown extending in a helical path through nose portion 14 and in any suitable path in the base portion 12 of the mold for flowing a heat transfer fluid therethrough during any suitable time in a molding cycle by controlling the operation of a valve or pump for effecting said flow. While the fluid is preferably one which is operative to receive heat from the mold wall transferred thereto from the molding material and to rapidly remove said heat so as to permit the molding to rapidly solidify, said passageway 15 may also be operative to carry a heated fluid if it is desired to melt or cure molding material previously disposed in the molding cavity V.

A second passageway, or passageways extend in a suitable formation through the nose portion 14 of the mold, and contains one or more electrical conductors 17 which may comprise resistance heating elements, an induction coil or electrical magnet coils operative to perform on the molding material as hereafter described. The passageway or passageways 16 which contain the electrical conductors 17 preferably also extend through the base portion 12 of the mold near the surface 13 thereof to openings in the mold member 11 and then to a source of intense electrical energy for energizing the electrical member or members in said passageways 16.

Mold member 20 has a side wall 21, a bottom wall 23, and a flange 22 circumscribing the side wall. The side and bottom walls, as well as the flange of the mold member 20, are shown having a plurality of passageways 25 and 26 extending in any suitable path therethrough. Passageway 25 is operative to receive and flow a heat transfer fluid through the wall of the mold for effecting heat transfer operations relative to the material being molded and passageway 26 contains one or more electrical conductors therein which connect to a source of electrical energy for energizing same so as to heat by resistance or inductance the material in the cavity V or to apply an intense magnetic force thereto for affecting the molding material as it solidifies in the manner described. The conductors 27 and 17 of FIG. 1 may comprise electrical resistance heating elements, or one or more coils of conventional wires or superconducting material operative when energized, to generate a magnetic field of the desired intensity in and surrounding the material being molded, forged or sintered to shape in the cavity of the mold.

In further embodiments of apparatus of the type shown in FIG. 1, the nose member 14 may comprise a removable probe operative to merely subject the molding material in the mold to vibrational, induction or magnetic energy during a portion of the molding cycle so as to affect the material's crystal growth as described but removable from the molding prior to complete formation or solidification thereof which formation may be effected solely in the mold 20 per se, by advancing another mold member thereagainst while in mold member 20 or by removal of the semi-solidified casting and the further molding or forging thereof.

Both mold members 14 and 20 are illustrated as being made up of a plurality of sections which, upon assembly, define the electrical and fluid passageways therein. The mold member or nose 14, for example, is made of at least two sections 18 and 18' each being tubular with the section 18 being hollow and defining a passageway 19 extending completely through the nose member or portion 14 and communicating with the molding cavity volume V'. Passageway 19 may be utilized for flowing or injecting molding material into the mold cavity volume and/or to serve one or more other functions. For example, passageway 19 may serve as means for applying shock waves or ultrasonic vibrations to the molding material in one or more manners. A fluid, other than molding material such as air or gas injected into passageway 19 may be pulsed or have shock waves generated therein which are transmitted after travelling down said passageway to the molding material immediately adjacent the end of nose 14 while 14 is fully inserted and/or during the removal of nose 14 from the solidifying molding material. A transducer, such as one made of a pietzo-electric material such as barium titanate, lead zirconate or other suitable material which will vibrate in the ultrasonic range when energized by high frequency electrical signals, may be disposed in passageway 19 at or near the end thereof and protected from the corrosive effects of the molding material by one or more means such as a metal plug at the end of passageway 19 and/or heat transfer fluid conducted through the passageways in the nose member 14 thereto.

The device of FIG. 1 may be utilized to mold and/or improve the internal structure of a variety of materials including metals, polymers and ceramics as well as composite materials by the application of one or more of the described forces of high amplitude, low frequency magnetic or sound vibrations, high frequency sound vibrations in the ultrasonic range (above 20 kilocycles), magnetic forces such as generated by one or more induction coils employing super-conducting magnetic wire or other suitable means disposed in the walls of mold members 14 or 20 and/or controlled heating resulting from one or more induction coils disposed in said walls of said mold components.

Further variations in the apparatus of FIG. 1 as well as the other embodiments to be described include the use of a plurality of spaced apart probes of the type defined by notation 14 which protrude into a mold, casting or extrusion die and are operative to simultaneously or sequentially generate one or more forms of energy and transmit same to the solidifying molding material for controlling crystal growth, orientation, grain refinement or any of the described variables. Such probe or probes may be fixed with respect to one die member or movable to retract from the molding, casting or forging as it solidifies so that said molding, casting or forging may be further worked by the dies or shaped in a manner other than that defined by the shape of the probe or probes. In other words, the probe or probes may be used for the combined function of shaping the material disposed thereagainst and affecting its internal structure or merely as a means for affecting its internal structure. The induction, magnetic or magnetodtrictive coil means disposed in the probe may be operated at a fixed intensity or power and frequency, or at a power level and frequency which predeterminedly varies during a molding cycle. Also, plural coil means and/or transducer means disposed in the mandrel or mold nose 14 and/or the wall of the outer mold member 20 may be separately energizable and energized in any desired sequence or at different predetermined power levels or frequencies during a molding cycle.

Figure 2:
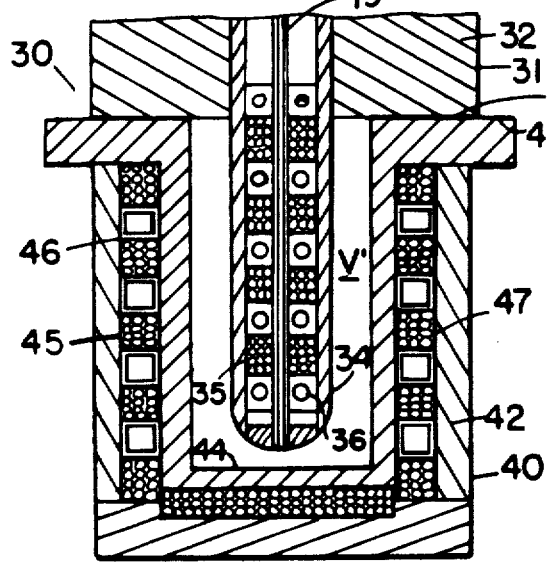
FIG. 2 is a cross-sectional view of a modified form of the mold assembly of FIG. 1.

In FIG. 2 is shown a modified form of the invention including molding apparatus 30 comprising a male mold member 31 and a female mold member 40 defining a molding cavity V' therebetween in which material may be injection molded, cast, forged, extruded, pressed or otherwise formed to shape from a molten, plastic or fluent condition. The male mold member 31 includes a base 32 having a surface 33 operative to sealingly engage the outer surface 41 of the female mold member 40. Notation 34 defines a nose portion of the male mold member which projects into the molding cavity of the female mold member and may be any suitable shape operative to define the inside surface of the molded article while the outer surface of said article is defined by the cavity surface 44 of member 40. Member 40 has a side wall 42 and a bottom wall 43 and may be of any suitable shape and structure. Nose portion 34 of male mold member 31 contains one or more coils 36 of a conducting metal or superconductor which coil may be utilized for induction heating the molding material or generating an intense magnetic field therein as said material solidifies for the purpose of affecting the internal structure of said material as described. The passageways or cavity 35 in the nose portion 34 are illustrated as cylindrical in shape and preferably has one or more passageways extending therefrom through the base portion 32 of the mold member 31 for connecting the wires 36 of the coil formation 37 with a source of energizing electrical potential. Also illustrated are one or more passageways 37 which extend through the nose portion 34 of mold member 32 for conducting a heat transfer fluid relative to the molding material and/or for admitting molding material to the cavity molding volume V'.

Mold member 40 is also illustrated as being hollow and containing one or more passageways 45 in the side wall 42 and/or bottom wall 43 thereof. Disposed in the passageways 45 are a plurality of conductors shaped as magnetic induction or heating coils 47 operative to affect the physical properties of the molding material as it solidifies by, for example, controlling crystal growth or the like.

It is noted that the mold structure of FIG. 2 may be subject to further modification wherein the nose member 34 of the male mold member 32 contains or is coupled to one or more ultrasonic transducers or means for vibrating the mold member and the nose 34 thereof at any suitable frequency including vibrations in the ultrasonic range operative to physically affect and improve the material being molded just as and immediately after it solidifies.

If the coil devices 47 disposed within the cavity 45 of the female mold 42 and/or those 36 disposed in the mandrel 34 of the male mold member 32 define super conducting magnets, then they may be utilized to cause expansion and partial reduction in the dimensions of the respective mold members or portions thereof sufficient to impart blows or compressive forces to material which is disposed within the mold cavity volume V' which may be substantially useful in affecting crystal structure and orientation assuming that said material initially completely fills the closed-off mold cavity.

By injecting molding material into the mold cavity volume V' at substantial pressure and retaining said pressure while either or both the walls of member 42 and mold member 34 are intermittently expanded and partially collapsed to increase and decrease the volume V', the material solidified, being extruded or compression molded in said mold cavity may be substantially affected as to its structure by, for example, increasing the density thereof, eliminating or substantially reducing porousity, controlling crystal growth and orientation.

Figures 3, 4, 5:
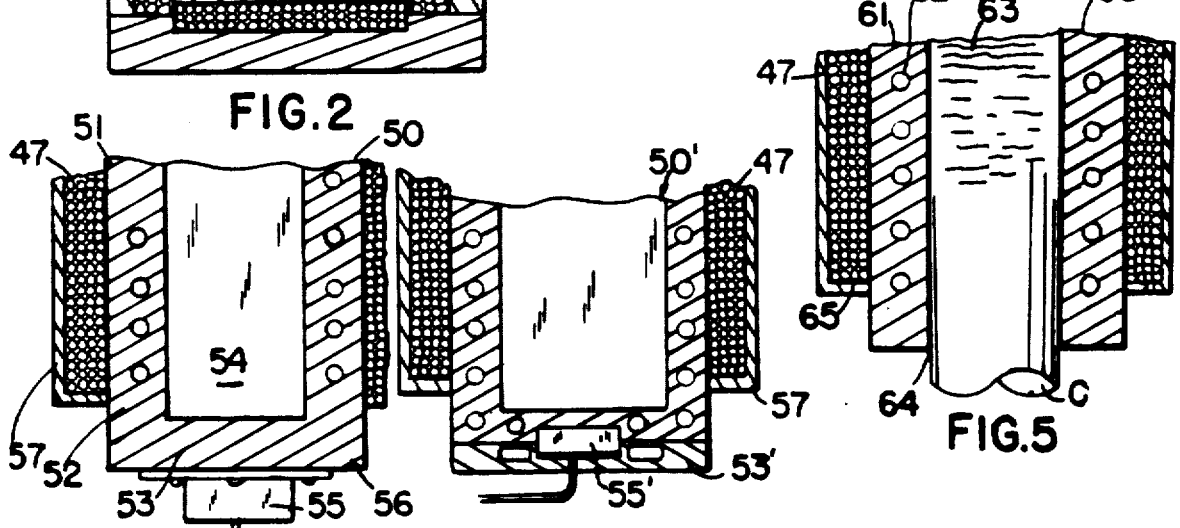
FIG. 3 is a cross-sectional view of a fragment of a mold having electrical transducing means surrounding at least a portion thereof.
FIG. 4 is a cross-sectional view of a fragment of a mold having transducing means about the mold and secured within the wall of the mold.
FIG. 5 is a cross-sectional view of a fragment of a continuous casting mold having transducing means surrounding a portion thereof.

Whereas the apparatus of FIGS. 1 and 2 provides means located within one or more mold components for coupling electromagnetic or induction energy to material disposed in the cavity of a mold, FIG. 3 illustrates part of a molding apparatus 50 having energy coupling means 55 situated outside of the mold but coupled to the wall thereof. The apparatus 50 includes a mold or die component 51 which may be one of a plurality of assembleable components operative to define a mold cavity 54 in which formable material is cast, pressed or otherwise shaped to conform to the wall thereof. The mold member 51 is shown as having a circumscribing side wall 52 and a bottom wall 53. Coupled to the bottom wall 53 is shown a transducer 55 such as an electrically excitable piezo electric transducer or other type of electrically excitable device operative, when electrically energized by applying the proper electrical energy to an input line 56 extending thereto, to generate and transmit vibrational energy such as ultrasonic waves to the wall 53 and therethrough to material disposed in the molding cavity 54 before said material has completely set or solidified so as to affect the internal structure of said material by orienting the crystals thereof and, in certain instances, by otherwise affecting crystal growth in a manner such as to provide a uniform or predetermined crystalline structure by the time the material has solidified. The transducer 55 may also be operative to improve the characteristics of the surface strata of the material formed in the molding cavity as well as to facilitate removal of said material from said cavity and is shown mounted on the drop-out door 56 of the mold.

Also illustrated in FIG. 3 is an assembly 57 which includes a plurality of coil windings 58 of insulated wire such as copper or any suitable superconductor which extend around the mold member 51 and are operative when energized to affect the material molded in cavity 54 in either or both of two manners. In a first manner of operation of the coil member 57, electrical energy transmitted thereto through an input line 54 is operative to induction heat and melt or otherwise affect material admitted to the molding cavity 54. In a second mode of operation, the energized transducer or coil located within member 57 is operative to generate an intensive magnetic field and is intermittently energized so as to create and collapse said field at a predetermined frequency for predeterminedly affecting the material being molded, cast or extruded in the mold or die member 51. If the member 57 is a superconducting electro-magnet, it may be operative in one or more modes such as, (a) control crystal growth, (b) orient crystals formed within the material disposed within cavity 54, (c) compact material disposed within 54 by affecting the dimensions of the mold cavity by causing the walls 51 of the mold to come closer together. (d) apply intermittent forces to the molding material by vibrating or reducing and expanding the cross sectional area of the mold cavity by means of magnetic forces applied to the wall of the mold, (e) applying impact forces by magnetic means to the wall of the mold and the material therein to affect crystal formation and orientation as well as to eliminate or reduce porosity in the molded material. By adding material to the mold when the magnetic field is removed and restraining said material so as to prevent the flow of same while a magnetic field is so applied, the density of a member molded within cavity 54 may be increased when compared with the density of such material molded without use of the electro-magnetic force generating means 57. The effect of such intense magnetic field on the mold itself may serve to reduce the volume of the mold cavity so as to compress the molding material while it is solidifying to increase its density, control or eliminate porosity, control crystal formation and growth, orient said crystals, etc.

In another form of the invention, molding apparatus of the type described may be utilized for molding particulate or powder materials with or without the application of induction, sonic or magnetic energy for predeterminately affecting the crystalline or grain structure of the articles so formed. For example, induction and/or resistance heating coils means may be provided within or about either or both of the assembled mold members and operative to heat the mold walls and particulate material disposed in the molding cavity. If the particulate material is a thermoplastic polymer or thermosetting resin which is cured by heat, the walls of either or both mold members may be inductively or resistance heated to effect melting of the charge and/or the curing thereof by heat transfer thereto through the walls of the mold. If the particulate material is metal powder such as aluminum powder, a predetermined quantity thereof may be charged into a mold cavity prior to or after assembly of the mold members and may be heated to a molten or semi-molten condition by energizing one or more induction coils disposed in one of the manners hereinabove described and illustrated in the accompanying drawings. Compositions of metal and/or ceramic powders with filaments such as metal whiskers may be charged into a mold, compressed and/or inductively heated to form a composite article and allowed to solidify by removal of the induction energy with or without the further application of force as described to effect the internal structure of said composite article.

In another form of the invention, one or more of the components of the mold may be heated by resistance heating elements disposed in or about the mold wall while other coil formations may be operative to generate induction energy in the particulate and/or whisker elements disposed in the mold as molding material to cause same to become molten or semi-molten while, an auxiliary magnetostictive electrical device or ultrasonic transducer may be operative at the proper interval during a molding cycle to impart ultrasonic vibrations to the material being molded through the wall or walls of either or both mold members for greatly enhancing the physical strength thereof such as by crystal orientation and improvement of grain boundary structure. As hereinbefore described, magnetic or vibrational energy may be so applied to the material being molded while it is in a semi-molten condition or just prior to the formation of the crystalline structure thereof so as to orient and predeterminately affect said structure and crystal growth.

A combination of relatively low amplitude ultrasonic vibrations and larger amplitude sub-ultrasonic vibrations may be simultaneously or sequentially applied to either or both mold members for transmission to the material being molded so as to beneficially affect the crystal structure of the material being molded during the latter stages of the formation thereof and either or both these techniques may be combined with the application of an oscillating magnetic field to the mold members and molding material disposed therebetween.

FIG. 4 shows a modified form of the invention wherein an ultrasonic transducer of the type described or any of the hereinbefore described electrical energy transducing means, is shown embedded or otherwise secured within the wall 53' of a mold 50' which is made as described. In such a construction, not only is the transducer protected by the wall of the mold from external blows, but it is positioned, as a result of being encapsulated or secured within the mold wall, much closer to the surface of the molding cavity, thereby resulting in substantially less attenuation than would be experienced if the transducer were operative to transmit wave energy completely through the entire thickness of the mold wall. In the operation of the apparatus of FIG. 4, as in the operation of the hereinbefore described apparatus, the combined effects of ultrasonics and intense magnetic fields may be utilized simultaneously or in sequence to improve the characteristics of the casting or molding.

In FIG. 5 is shown apparatus of the type described applied to a continuous casting mold 60 the upper end of which is illustrated just below the ladle (not shown) which is operative to feed molten metal to said mold. The mold is shown as having a side wall 61 with one or more passageways 62 therein for flowing heat transfer fluid through the mold during the continuous formation and downward travel of a casting C shown exiting from the open end 64 of the mold cavity or passageway 63 extending completely through the mold or die 60. Intense ultrasonic waves are generated by one or more transducers provided in one or more housings 65 completely or partially surrounding the side well 61 of the mold 60. Said housing 65 may also contain one or more super-conducting magnetic coils and lead-in wires extending from a source of suitable electrical energy for energizing said coils and generating a time varying intense magnetic field in the mold wall and through the molding material in the volume thereof containing semi-molten and solidifying material so as to predeterminedly affect grain structure, crystal growth and crystal orientation within the continuously cast rod or billet. The portion of the continuous casting mold 60 illustrated in FIG. 5 includes metal in a solid phase near the bottom end of the mold and in a semi-molten and molten phase near the upper end of the mold. Accordingly, the ultrasonic energy and/or intense variable or oscillating magnetic field is generated in the region which includes the solidifying phase of the casting so as to beneficially affect the internal structure of the casting as hereinbefore described.

Figure 6:
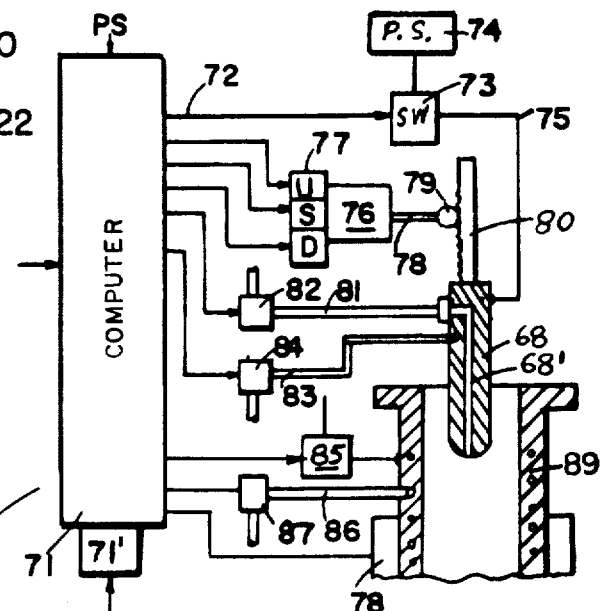
FIG. 6 is a schematic diagram illustrating an automatic control system operative to control both molding and transducing means of the types shown in FIGS. 1–5.

Apparatus is illustrated in FIG. 6 for controlling variables of the hereinbefore described molding apparatus. The control system 70 includes a multi-circuit controller 71 comprising a computer, tape or card reader, multi-circuit timer or the like operative to generate a sequence of signals at predetermined time intervals during a controlled cycle, or signals resulting from internal computations of the device 71 on a plurality of outputs 72 thereof which extend to various switches, valves and controls as hereinafter described.

A control cycle is initiated when molding material is admitted to the mold or die 69 which may comprise any of the hereinbefore described molds or dies. The material may be poured into the mold 69 from the open end thereof or injected through the opening in nose member or nozzle 68 disposed in or just above said die. Assuming that member 68 is both an injection nozzle and a probe operative to transmit ultrasonic or other forms of energy to the molten material in the mold, a charge of the molding material is admitted to the passageway 68' in 68 through an inlet line 81 connected to a supply of said material (not shown) through a valve 82 which is solenoid or servo motor operated. The solenoid or servo motor for valve 82 is activated by a signal generated by the controller 71 to close and admit molding material to the mold 69. Prior to or just after admission of the complete charge to the mold or die 69, the mandrel or probe 68 may be lowered into the melt for the purposes described by means of a servo motor 76 which is controlled in both forward and reverse directions by signals generated by controller 71 and which has its output shaft 78 coupled to a spur or worm gear 79 which is coupled to a suitable gear 80 extending upwardly from member 68 to urge the downward and upward thereof depending on the operation of servo 76.

With the projection of mandrel or probe 68 into the melt, the described transducing means mounted therein may be energized by activation of a normally open switch 73, by a signal from controller 71 connecting a source 74 of suitable electrical energy to the input line 75 extending to the transducing means in probe 68. The transducing means located in said probe then operates in the manner described to effect suitable control of the solidifying molding material and transducing means located in the mold member 69, as described, may also be energized by closing a second normally open switch 85 disposed between the input line to the transducing means in the mold wall and a suitable source of electrical energy. Also illustrated in FIG. 6 are valve means 84 and 87 for controlling the flow of heat transfer fluid through lines 83 and 86 extending respectively to the passageways in the probe 68 in the mold wall 69. Predeterminedly controlling the flow of heat transfer fluid in both the probe and the mold wall may be effected to predeterminedly control crystal growth and solidification of the casting or molding in a predetermined manner concurrent with the predetermined control of the operation of the transducing means. In other words, since the transducing means is operative at a predetermined time during the solidification of the molding in the mold, and since the rate of flow of heat transfer fluid is directly proportional to the manner in which solidification occurs, control of both these variables should be the result of programming the means for varying same preferably in a closed loop control cycle which includes means for measuring temperature or other variables associated with the molding or casting and generating feedback signals to be bucked a standard signal or a signal which varies predeterminedly with time during the cycle.

Figure 7:
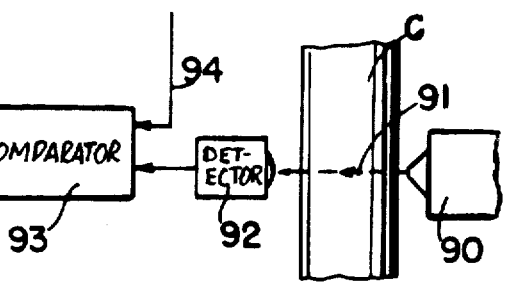
FIG. 7 shows portions of a control system for casting apparatus of the type shown in FIG. 5.

While the apparatus of FIG. 6 is illustrated as being substantially an open loop control system, FIG. 7 illustrates means for closing the loop by scanning a portion of a casting such as the continuous casting C of FIG. 5 with an X-ray means. The apparatus includes an X-ray generating transducer located in the housing 90 for generating and passing X-rays along a path 91 completely through the casting C which are picked up by a receiver 92 located across the other side of the casting and operative to generate an output signal which varies in accordance with variations in the internal structure of the casting. The output signal is passed to a comparator device 93 such as a summing amplifier which receives a reference signal on a second input 94 thereto and the output 95 of 93 is an error signal which may be passed to the computer located within the controller 71 which may be an adaptive device operative to adjust or vary the duration of signals generated on the output of the device and passed to the various controls for controlling the variables described.

In temperature sensing apparatus, the X-ray generating means located in housing 90 may be eliminated if the device situated in housing 92 is an infra-red scanner operative to scan the continuous casting C and generate on its output a signal which varies in proportion to variations in temperature of said casting so as to provide a signal to comparator device 93 which is bucked against a reference signal generated on input 94 for providing a error signal on the output 95 thereof. The resulting error signal may be used to current one or more of the output signals generated by the computer in device 71 of FIG. 6 for correcting, for example, the rate or duration of flow of heat transfer fluid, duration or intensity of energy utilized to energize one or more of the transducers described, rate of flow of molding or casting material, location of the probe or mandrel 68, etc.

Figure 8:
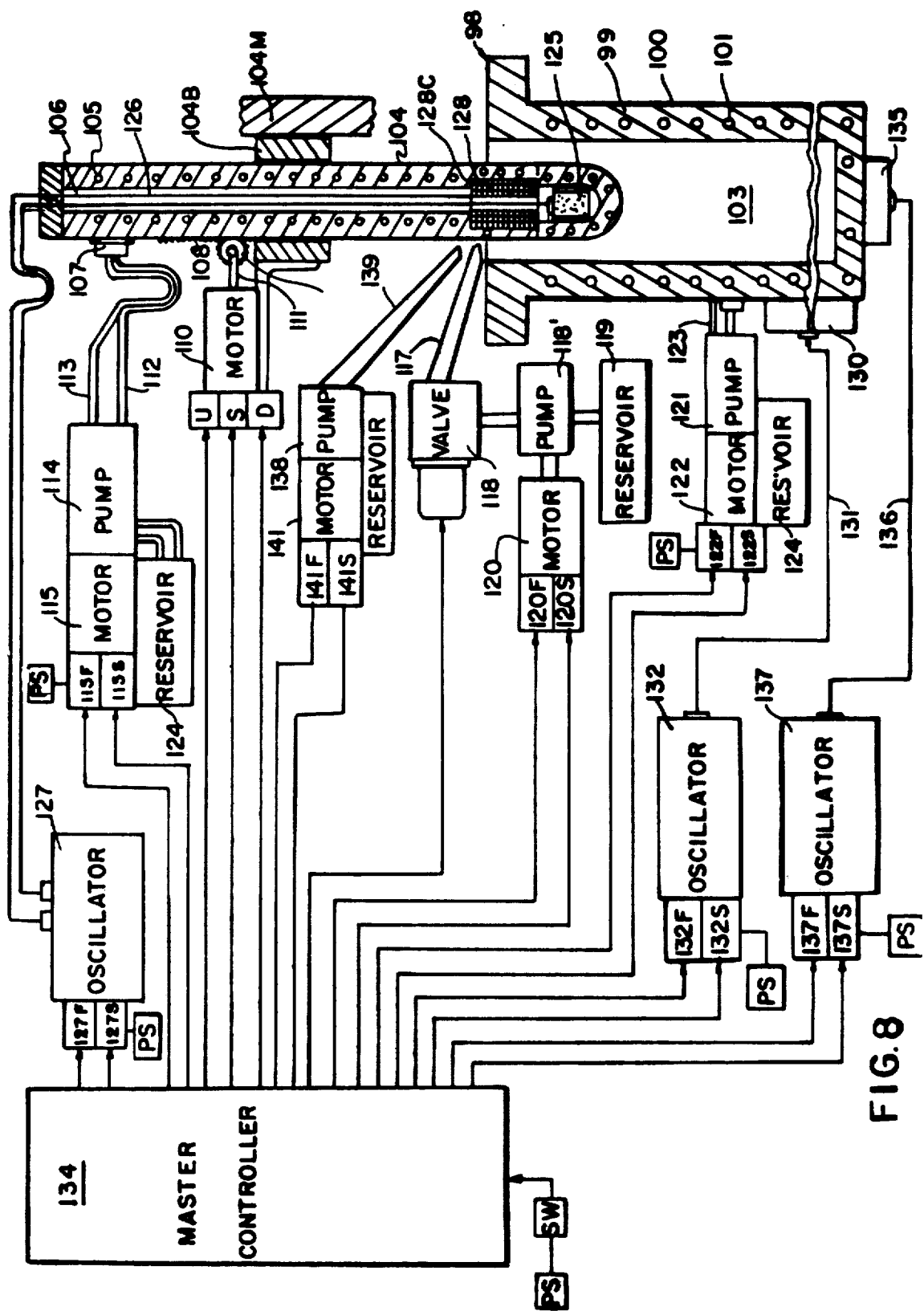
FIG. 8 is a schematic diagram of a modified form of the control system of FIG. 6 and applicable for controlling a molding, casting or extrusion process employing the molds of FIGS. 1–6 for modifications thereto as illustrated in FIG. 8.

FIG. 8 illustrates a control system applicable to the apparatus hereinbefore described whereby a plurality of forms of transducing means are provided in coupling relationship with the mold components and may be operative per se, in sequence or concurrently during one or more times in a molding, casting or extrusion process to predeterminately affect and control the molded or extruded article.

The apparatus of FIG. 1 includes a mold assembly 98 which is illustrated as composed of a mold 99 having a side wall 100 containing a plurality of passageways therein denoted 101, through which passageways flow a heat transfer fluid for controlling the rate of solidification of the molding material in the mold. While the mold of FIG. 8 is illustrated as closed as its lower end, it may be designed in accordance with any of the structures hereinbefore described and may include, in addition to a casting mold as illustrated, an injection mold for molding synthetic polymers or metal under pressure, a die-casting mold, a continuous casting mold open at the lower end for continuously downwardly casting elongated shapes or an extrusion die through which metal, plastic or ceramic materials may be continuously forced and formed to shape or a compression mold for shaping molten or particulate material.

The mold 99 is illustrated as open at the upper end, although it may contain a closure means of the type described, and is shown having a probe 104 movable from a position above the mold into the molding material or melt disposed in the mold cavity 103. A pouring spout 117 is disposed over the mold cavity for flowing or injecting a predetermined quantity of molding material therein. Molding material is flow-regulated by means of a valve 118 and pump 118' disposed between a reservoir of molding material and the spout 117. The pump 118 is controlled by a gear motor 120 having on and off controls 120F and 120S which are connected to a master controller 134 to be described.

The probe 104 is shown movably supported in a lineal bearing 104B which is supported above the mold on a mount 104M which is supported by the same frame or mount supporting the mold. A passageway 106 extending longitudinally through the probe 104 contains wires for conducting electrical energy of suitable frequency and amplitude to a plurality of transducers disposed within the probe. One transducer 125 is shown secured within the lower end portion of the probe 104 and may comprise an ultrasonic transducing means such as one or more formations of barium titanate or lead zirconate as described and properly mounted within the probe to predeterminately radiate ultrasonic vibrations through the probe wall and outwardly therefrom. A second transducer 128 is also mounted within a cavity 128C in the probe wall and mounts one or more coils of wire which operate, as described, to impart magnetic or induction fields to the molding material surrounding the probe.

A passageway 105 extends through the probe wall for conducting heat transfer fluid therethrough to protect the probe and the transducing means mounted therein from heat damage.

Notation 107 refers to a fluid coupling connecting the passageway or passageways 105 with a flexible metal hose lines defining two passageways for conducting heat transfer fluid to and from the passageways in the probe. A pump 114 driven by a gear motor is operative to predeterminately flow heat transfer fluid to and from the probe passageway 105 through flexible lines 112 and 113. The pump 114 is operated by a gear motor 115 having on and off controls 115F and 115S which are respectively controlled by the master controller 134.

A second pump 121 is operatively connected through an output line 123 to a passageway 101 extending through the wall 100 of the mold for controlling heat transfer fluid flow and solidification of molding material disposed in the mold cavity 103. The pump 121 is operated by a gear motor 122 having on and off controls respectively designated 122F and 122S which are also controlled by signals generated by the master controller 134. Notation 124 refers to a reservoir for supplying heat transfer fluid to the pumps 121 and 114.

The probe 104 is predeterminately positioned within the mold cavity 103 and either retained therein during an entire molding procedure, varied in its location during the molding procedure or removed therefrom prior to complete solidification of the molding material by a positioning arrangement which includes a reversible gear motor 110 having an output shaft 111 connected to gears 109, one of which gears is coupled to teeth 108 formed in the wall of the probe 107 or a rack connected thereto. Thus, depending on the direction of rotation of the shaft 111 of motor 110, and the time of operation of said motor, the location of the probe 104 within the mold cavity 103 may be predeterminately controlled.

Four types of transducing means are illustrated in FIG. 8, two of which are mounted in the probe 104 and have been described. The transducer 125 is connected by means of suitable lines 126 to an ultrasonic energy generator 127 such as a high-frequency oscillator of suitable known design operative to vibrate the transducer in the range of 20 to 100 kilocycles or higher for imparting suitable desired vibrations to the molding material through the probe. Notation 127F and 127S refer to on and off controls for the oscillator or generator 127 which controls are respectively connected to lines extending from the master controller 134 to operate and shut down the generator 127. Wherever utilized, the notation PS refers to a suitable source of electrical energy. It is assumed that one or more sources of electrical energy are connected to all of the components illustrated in FIG. 8 requiring same, whether illustrated or not, to provide suitable operation of said components.

Shown operatively coupled to the side wall 100 of the mold 99 is a first transducer 130 which may be made in accordance with any of the described structures and may comprise one or more piezo electric ultrasonic transducers for imparting ultrasonic energy through the wall of the mold to the molding material or one or more coils of electrical conducting wire for generating intense magnetic fields or induction energy which is applicable, as described, to the molding material in the mold cavity 103.

In other words, the notation 130 is symbolic and refers to what may comprise one or more of the same type of transducer or a plurality of different types of transducers properly disposed within and/or about the wall of the mold. The transducer 130 is operatively connected to a generator 132 of suitable electrical energy through lines 131. The source 132 contains on-off controls denoted 132F and 132S connecting it with a power supply PS for energizing same. The device 132 may comprise a suitable oscillator if the transducer 130 is an ultrasonic transducer or a power supply or transformer for providing suitable electrical energy to energize the transducer 130 for generating magnetic or induction energy, as described.

Also shown in FIG. 8 is a second transducer 135 which is operatively coupled to the bottom wall of the mold for imparting similar or different energy than that generated by transducer 130 to the molding material disposed in the mold cavity. The transducer 135 may thus comprise one or more piezo electric transducers, magnetic coils, or induction means associated with the bottom or side walls of the mold as hereinbefore described and may be operated concurrently or in sequence with the operation of the transducer 130 to apply the same or different types of wave energy to the solidifying molding material disposed in the mold cavity.

Turning now to the master controller 134, which may comprise, as described, an analog or digital computer or, in a simpler form, a preset or preprogrammed, self-recycling multi-circuit timer. Such a multi-circuit timer may be made in accordance with the teachings of such patents as U.S. Pat. No. 2,580,787, U.S. Pat. No. 1,172,080 and others known in the art operative for carrying out a predetermined program of operations by closing and opening one or more electrical circuits at predetermined times during a cycle of operations. In its simplest form, the device 34 may comprise a shaft driven by a constant speed electrical motor and containing space-separated cams which are so located on said shaft as to open and close various contacts or switches during predetermined times in the rotation of the shaft for predeterminately controlling the motors, solenoids and switches associated with the components of the system described for attaining the desired described results.

While separate high frequency electrical generators may be utilized as shown for driving each of the probe and mold wall mounted transducers described a single oscillator may be utilized to drive two or more, if not all of the transducers simultaneously or in sequence. A variable frequency oscillator may also be provided for driving one or more of the described transducers.

For most polymers and metals, apparatus of the type described herein which utilizes ultrasonic wave energy to control crystal growth and improve or refine grain structure of the metal may be operated in the frequency range of 20 to 100 kilocycles per second or greater and in the power range of 50 to 500 watts depending on the effects desired and the cross section of the molding, casting or extrusion subjected to such ultrasonic radiation. Crystal orientation and grain refining will be improved with increasing power input to the solidifying melt. The application of vibratory energy, whether ultrasonic or subsonic, as well as the application of other forces such as intense magnetic fields, should be applied to the melt just above the solidification temperature, say 150° to 300° F. above the solidification temperature of metal and continued to solidification. In refining aluminum and its alloys, for example, the vibrational energy or oscillating magnetic field may be applied to the molten material of the molding or that portion of the continuous casting which is at a temperature in the range of 1250° F. to 1300° F. and continued to or beyond solidification at approximately 1000° F.

Ultrasonic and subsonic waves may be simultaneously or sequentially applied to the solidifying material per se, or simultaneously or sequentially with the application of an intense oscillating (expanding and collapsing) magnetic field to the molding or casting as described to improve grain and crystal structure of plastics, metals and certain ceramic materials.

The intensity of the magnetic field generated in the mold and casting or other shape will depend on the size of the molding, forging or casting being treated by the intense magnetic field generated by the magnetic coil situated in or about the mold. In general, magnetic fields in the range of 100 to 1000 kilogauss will suffice to grain refine most ferrous and non-ferrous metal shapes and serve to substantially reduce or eliminate the porosity thereof as well as to orient and control crystal growth. Lower intensity constant and/or intermittently generated magnetic fields (10 to 100 kilogauss) may be employed to control crystal growth in polymeric and ceramic materials.

In FIG. 8 notations 131 and 136 refer to cables extending from suitable sources of alternating electrical energy 132 and 137 to transducers 130 and 135 coupled to the side and bottom walls of mold 99. On and off controls denoted 132F, 132S, 137F and 137S for the oscillators 132 and 137 and are connected to respective outputs of the master controller or multi-circuit timer 134 and may comprise respective inputs of respective bi-stable switches pulsed by signals received from said master controller.

Also shown in FIG. 8 is an apparatus 138 for controllably adding material to the molding material preferably as the latter is delivered to the mold through the pour spout or injection nozzle 117. The apparatus 138 includes one or more pour spouts or injection nozzles 139 and means 140 for controllably delivering said material or a plurality of materials either into the stream of molding material flowed through spout 117 or the mold itself. The additive may comprise a liquid or molten plastic or metal, hard particles, short filaments, whiskers, etc. or combinations of such materials which are premixed or delivered from separate nozzles or injectors. Accordingly, dependant on what form the additive material is in, delivery means 140 may comprise a controlled pump, solenoid valve, vibrator, belt conveyor or control means for pressurized gas operative to carry the additive. Notation 141 refers to a controlled motor for operating the pump or conveyor 140 in response to signals received on its inputs 141F and 141S from the master controller 134. Motor 141 may also be variably controlled in its operation by suitable analog and/or digital control signals generated by the master controller 134 and applied to a digital or analog controller as defined in U.S. Pat. Nos. 3,412,431 and 3,422,648. In other words, means are provided in the apparatus of FIG. 8 for variable controlling the rate of flow of additive material to the molding material in the mold and the timing of the admission of said material if such variables are required to produce moldings or castings having predetermined physical characteristics. Since the timing of the flow of additive is also controllable, articles may be produced by means of the apparatus of FIG. 8 which vary in physical characteristic or additive content throughout the article.

It is noted that the motor 120 controlling operation of pump 118 may also be variably controllable in its operation and controlled in a preprogrammed manner by suitable digital or analog command control signals generated by the master controller and applied as disclosed in my U.S. Pat. Nos. 3,412,431 and 3,422,648. If one or a plurality of additives are also admitted or injected into the mold in a varably controlled manner, as described, by means of command control signals generated by the master controller 134 and the other variables such as ultrasonic energy generation and transmission, rate of flow of coolant through the mold wall, etc. are also variably controllable by signals generated on respective outputs of the master controller 134, then the apparatus of FIG. 8 may be automatically operated to accomodate a variety of different molds, molding materials and additives to form articles or castings having wide ranges of physical characteristics.

The apparatus of FIG. 8 may be employed to provide new and improved single and continuous castings of metal which are dispersion strengthened with fine particles of ceramic material which are disposed peppered throughout the microstructure of the casting in a uniform or variably predetermined density as determined by properly programming the master controller 134 to control metal and particle flow, mold and metal vibration and cooling rate. Nickel and nickel-chromium alloys of various composition may be cast or injection molded as described with fine particles of thorium oxide 0.0001 to 0.00001 inches in diameter added to the poured or injected metal or the melt in the mold by the means of FIG. 8 to substantially improve the strength of the metal composite so produced at high temperatures. The employment of vibrations and/or magnetic field energy as described may be effected during the addition of the ceramic particles to uniformly or otherwise predeterminately disperse the particles in the casting. The application of said energy or energies may also be used to improve the macro and micro-structures of the metal casting or molding while simultaneously uniformly predeterminately dispersing said particle in the casting. For example, the application of said energy may be used to align the metal crystals or grains and grain boundaries falling along the major stress axis of the casting or molding providing a columnar grain structure which will improve the high temperature properties of the casting.

Carbon or graphite filaments, ceramic fibers such as boron nitride, aluminum oxide, metal crystals such as whiskers and the like may also be added to and dispersed within or predeterminately located in the casting by automatically controlling the flow and or position of the dispensing nozzle or nozzles 139 by means of signals generated by the master controller 134 as described.

The apparatus of FIG. 8 may be operated to effect controlled solidification patterns in castings and moldings by differentially and predeterminately heating the mold or die 99 with or without the application of auxilliary energy as described. For example, a plurality of pumps similar to pump 121 and respective driving motors controlled in their operation by signals generated by the master controller 134 as described, may each be operative to control the flow of coolant liquid to different passageways in different portions of the wall of the mold or die 99. By thus differentially cooling the wall of the mold so that metal solidification is made to advance as a uniform front along the axis of the casting, the grain boundaries are made to line up along the major stress axis. By properly controlling the flow of heat transfer fluid, as described, during the casting procedure monocrystalline castings may be produced having superior physical characteristics at temperature. The use of vibrational energy as described may be employed to assist in the formation of such monocrystalline structures.

It is noted that the apparatus hereinbefore described may also be operated to improve the physical properties of castings in the die or mold in which they are cast by so called strain hardening effected by predeterminately applying vibrational forces to the mold by means of the transducers described and/or by the application of strain energy to the casting during and after its solidification while still in the mold by the described magnetic coil means surrounding the mold which are energized and deenergized one or more times to apply forces to the mold and casting which subject the casting to the strain hardening deformation.

The apparatus hereinabove described and particularly that illustrated in FIG. 8 may also be utilized to provide a coarsegrained microstructure in metal alloys containing dispersion strengthening components thereby providing strength for the alloy at a wider range of temperatures than would ordinarily be experienced during the alloying steps effected by conventional means. For example, when aluminum and titanium are added to Ni-Cr-ThO$_2$ intermediate temperature strength (1200 F.) is increased but the strength of the alloy at 2000 F. is little improved due to the precipitation of the Ni$_3$(Al,Ti) phase which prevents the microstructure from becoming coarse grained. While thermomechanical treatment resulting from controlled heating and cooling of the alloy has little effect on improving the grain structure, the application of ultrasonic vibrations, as described, during and immediately after alloying and particularly while the alloy is cooling may be utililized to provide a coarse grained microstructure so as to provide an increase in strength of the dispersion hardened alloy at low, intermediate and high temperatures. The apparatus described and illustrated in FIG. 8 may also be utilized to predeterminately produce alloys and dispersion hardened metals by program controlling the flow of two or more alloying metals and particles such as thorium oxide, titanium carbide, aluminum oxide and other materials to an alloying chamber or crucible, controlling temperature of the melt and controlling ultrasonic vibrations during the addition and hardening phases of alloying and predeterminately varying these variables during a cycle to provide a metal alloy which is predeterminately composed, predeterminately dispersed with particles and of predetermined grain or crystalline microstructure.

The apparatus described may also be utilized to produce new alloys having predetermined microstructures. For example, fine grains of carbon (0.0001 to 0.00001 inches in diameter) may be dispersed uniformly throughout iron, steel, nickle, copper, aluminum and other metals as well as alloys of these metals and/or may be disposed along the grain boundaries of course grained microstructure to improve the physical characteristics thereof. Said carbon may comprise pyrolitic graphite or other forms of graphite which will maintain its granular identity at the temperature required for alloying or melting and dispersing same in the melt. Similar fine grains of other ceramic mate such ruthenium dioxide may be similarly dispersed in the melt of such metals or various alloys thereof, per se or in combination with other particles by the application of ultrasonic energy to the melt and solidifying metal by the means described. Since ruthenium dioxide is unusually stable and is electrically conductive and oxidation resistant, it may be used to both dispersion harden and improve the electrical conductivity of various metals and alloys such as ferrous metals and alloys, aluminum alloys, certain copper alloys such as titanium copper and zirconium copper, beryllium copper and other beryllium alloys, tungsten and titanium metal and alloys, etc. Controllably energized coils disposed in the wall of the mold and/or the probe may also be utilized to generate intense magnetic fields in the molding material to predeterminately align or otherwise dispose particles or filaments as described in the final casting or molding. Ruthenium dioxide, for example, which is electrically conductive, may be positionally controlled and aligned within the casting or molding by magnetic field forces applied by magnetic coils surrounding the mold, disposed in the mold wall or disposed in the probe.

The apparatus described or modifications thereof may also be utilized for molding particulate materials to shape such as metal or plastic powders which are compacted in the mold by means of the probe and worked by a combination of probe movement and vibrations imparted through the probe and mold walls as described. Magnetic and induction energy may also be applied to compress and heat the particles in the mold in a predetermined manner as defined by the signals generated by master controller 134, so as to either render said particles in a molten or sintered condition. The ultrasonic and magnetic vibrations described may be utilized to predeterminately compact and control the macro and micro structure of the material worked by the probe or male mold member in the mold.

In another form of the invention, the material admitted to the mold may comprise a monomer such as a synthetic plastic monomer per se, may be mixed with a monomer or contain a monomer coated thereon. For example, particles or filaments may be admitted to the mold which are either precoated with a plastic monomer or coated in the mold with a monomer admitted thereto as a liquid or vapor. Ultrasonic energy imparted to the monomer through the probe 104 and/or the mold walls may be operative to polymerize the monomer thereby either forming a solid shape thereof or bonding the particles or filaments together into a solid or porous mass.

Ultrasonic energy generated in the probe or transducers mounted in the mold wall or surrounding the mold may also be utilized to either effect or assist in the production of carbonized material in the mold or die. For example, cabronizable material such as a suitable plastic polymer containing a hydrocarbon such as acrylonitrile resin, may be carbonized per se in the mold by heating the mold and transmitting ultrasonic energy thereto as described or may be formed as an extrusion or extrusions passing through the mold by heat applied to the mold wall and ultrasonic energy applied thereto through the probe or mandrel and/or mold walls. Particles coated with a monomer or polymer may be polymerized and carbonized in the mold by means of heat and ultrasonic energy applied to the mold and probe as described.

To effect the forms of the invention described above, the ultrasonic energy may be applied in the range of 20 to 200 k.c.s. and the heat at the temperature required to carbonize the particular polymer. Intense magnetic field energy may be generated in coils surrounding the mold wall or within the probe and operative to expand and contract the mold walls, probe and/or solid material disposed within the mold such as particles, filaments, chips and the like or solidified molten molding material so as to work the latter and improve it macro and/or micro-structure.

If the mold described is a die employed to effect the continuous casting or extrusion of the material fed thereto to shape, the probe may comprise a mandrel for shaping the interior of the casting or extrusion and the generation of one or more forms of vibrational energy therein by the means described may serve not only to improve and predetermine the internal structure of the casting or extrusion but also to reduce the force required to pull the casting from the mold or force extrusion material through the die. Similarly, vibrational energy applied to the walls of the mold or die may also be operative to improve internal structure of the molding, casting or extrusion and to reduce the force required to extrude or remove the casting from the die. The formation of composite extrusions or castings involving the coating of one material on a core material may also be facilitated by ultrasonic and/or magnetic field energy applied as described and operative to perform one or more of the functions of facilitating extrusion or casting as described, improving the physical characteristics of the core material, improving the physical characteristics of the coating material, improving the bond between the core and coating material by welding, molecularly bonding or causing the material of either to penetrate the surface stratum of the other. If the coat9ng is a monomer, it may be polymerized as it is disposed against the core material by ultrasonic energy applied as described herein.

I claim:

1. A method of forming an article to shape from thermal plastic resin in a molten condition and simultaneously improving the physical characteristics of such resin forming said article comprising:

causing a molten plastic resinous material to flow through an extrusion die, and while said resinous material admitted to said die is in a plastic and formable condition, causing said plastic material to conform to the shape of said die, thereafter solidifying said plastic material flowed to said die to a predetermined shape, and prior to the solidification of said plastic material, subjecting said material to ultrasonic vibrations of sufficient frequency and intensity such that the vibrational energy reacts on the material in a manner to substantially change and improve its crystalline structure over that structure of said material existing prior to rendering said material in said molten condition.

2. A method of fabricating thermal plastic polymers comprising the steps of heating a polymer to a flowing condition, forming said polymer into a desired shape by passing said polymer through an extrusion die while in said flowing condition and cooling the polymer to a non-flowing condition after it has passed through said die, the improvement which comprises subjecting the polymer during at least a portion of the cooling step to ultrasonic vibrations which are generated and applied thereto through the wall of said die in a manner to substantially change and improve the crystalline structure of the solidified polymer over that structure of the polymer which existed prior to subjecting said polymer to said ultrasonic vibrations.

3. A method in accordance with claim 2, which includes at least partly so defined said polymer within said extrusion die so that the polymer substantially retains the shape upon leaving said die.

4. A method of forming an extrusion from a polymer and simultaneously improving the physical characteristics of the polymer during the forming of the extrusion comprising:

causing a molten polymer to flow to an extrusion die, and while the polymer admitted to said die is in a plastic condition, causing said polymer to conform to the shape of said die, thereafter solidifying said polymer in said die to a predetermined shape, and prior to the solidification of said polymer subjecting said polymer to ultrasonic vibrations of sufficient intensity such that the vibrational energy reacts on the polymer in a manner to substantially change and improve its crystalline structure over that structure existing prior to rendering said polymer in said molten condition.

5. A method in accordance with claim 4 wherein said ultrasonic vibrations are transmitted to said polymer through the wall of said extrusion die.

* * * * *